United States Patent
Rowe et al.

(10) Patent No.: US 9,296,043 B2
(45) Date of Patent: *Mar. 29, 2016

(54) SYNTHESIS OF METAL NANOPARTICLES

(71) Applicant: Toyota Motor Engineering & Manufacturing North America, Inc., Erlanger, KY (US)

(72) Inventors: Michael Paul Rowe, Pinckney, MI (US); Nikhilendra Singh, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/046,120

(22) Filed: Oct. 4, 2013

(65) Prior Publication Data
US 2015/0099172 A1    Apr. 9, 2015

(51) Int. Cl.
| | |
|---|---|
| C22C 1/00 | (2006.01) |
| H01F 1/06 | (2006.01) |
| B22F 9/24 | (2006.01) |
| C22C 22/00 | (2006.01) |
| B22F 9/16 | (2006.01) |
| B22F 1/00 | (2006.01) |
| H01M 4/38 | (2006.01) |
| C22C 13/00 | (2006.01) |
| H01M 4/02 | (2006.01) |
| H01M 4/90 | (2006.01) |

(52) U.S. Cl.
CPC ............... *B22F 9/16* (2013.01); *B22F 1/0003* (2013.01); *C22C 13/00* (2013.01); *H01M 4/387* (2013.01); *H01M 4/9041* (2013.01); *H01M 2004/021* (2013.01); *Y10S 977/948* (2013.01); *Y10T 428/2982* (2015.01)

(58) Field of Classification Search
CPC ... H01F 1/0054; H01F 1/065; Y10S 977/896; Y10S 977/838; B22F 9/24; B22F 2009/945; C22C 2202/02; C22C 1/00; C22C 22/00; B82Y 40/00; B82Y 30/00
See application file for complete search history.

(56) References Cited

U.S. PATENT DOCUMENTS

| | | | |
|---|---|---|---|
| 7,041,350 B1 | 5/2006 | Rule et al. | |
| 7,927,507 B1* | 4/2011 | Li et al. | 252/182.33 |
| 2005/0217427 A1 | 10/2005 | Suthersan et al. | |

(Continued)

FOREIGN PATENT DOCUMENTS

| | | |
|---|---|---|
| WO | 2012007830 A1 | 1/2012 |
| WO | WO2013063161 A2 | 5/2013 |

OTHER PUBLICATIONS

Singh et al, "Electrodes and Electrochemical Cells Emplying Metal Nanoparticles Synthesized Via a Novel Reagent", co-pending U.S. Appl. No. 14/219,836 filed Mar. 19, 2014.

(Continued)

*Primary Examiner* — Stanley Silverman
*Assistant Examiner* — Syed Iqbal
(74) *Attorney, Agent, or Firm* — Christopher G. Darrow; Darrow Mustafa PC

(57) ABSTRACT

Methods for synthesizing metal nanoparticles and the nanoparticles so produced are provided. The methods include addition of surfactant to a novel reagent complex between zero-valent metal and a hydride. The nanoparticles produced by the method include oxide-free, zero-valent tin nanoparticles useful in fabricating a battery electrode.

25 Claims, 3 Drawing Sheets

(56) References Cited

U.S. PATENT DOCUMENTS

| | | | |
|---|---|---|---|
| 2009/0011297 A1* | 1/2009 | Jang et al. | 429/19 |
| 2009/0090214 A1 | 4/2009 | Cheng | |
| 2009/0264277 A1 | 10/2009 | Raj et al. | |
| 2010/0021799 A1* | 1/2010 | Rieke | 429/50 |
| 2013/0084502 A1 | 4/2013 | Singh et al. | |

OTHER PUBLICATIONS

Singh et al., "Metal Nanoparticles Synthesized Via a Novel Reagent and Application to Electrochemical Devices", co-pending U.S. Appl. No. 14/219,831 filed Mar. 19, 2014.

Mohtadi et al., "Magnesium Ion Batteries and Magnesium Electrdes Employing Magnesium Nanoparticles Synthesized Via a Novel Reagent", co-pending U.S. Appl. No. 14/328,647 filed Jul. 19, 2014.

Mizuno et al., "Metal-Air Batteries and Electrodes Therefor Utilizing Metal Nanoparticle Synthesized Via a Novel Mechanicochemical Route" co-pending U.S. Appl. No. 14/307,017 filed Jun. 17, 2014.

McDonald et al, "Electrodes Containing Iridium Nanoparticles for the Electrolytic Production of Oxygen from Water", co-pending U.S. Appl. No. 14/328,635 filed Jul. 10, 2014.

Imamura et al., "Dehydriding of Sn/MgH2 nanocomposite formed by ball milling of MgH2 with Sn", Int. J. Hydrogen Energy, 32, 4191-4194.

Valvo et al, "Electrospraying-assisted synthesis of tin nanoparticles for Li-ion battery electrodes", J. Power Sources, 189, 297-302.

Zou et al, "Size-dependent melting properties of Sn nanoparticles by chemical reduction synthesis", Trans. Nonferrous Met. Soc. China, 20, 248-253.

Schüth, F. et al., "Light Metal Hydrides and Complex Hydrides for Hydrogen Storage", Chem. Commun., 2004, pp. 2249-2258, Issue 20.

* cited by examiner

SYNTHESIS OF METAL NANOPARTICLES

TECHNICAL FIELD

The present invention relates in general to a method of synthesizing nanoparticles of zero-valent metal, in particular nanoparticles of zero-valent tin, and also relates in general to nanoparticles of elemental metal, in particular nanoparticles of tin.

BACKGROUND

Metal nanoparticles, particles of elemental metal in pure or alloyed form with a dimension less than 100 nm, have unique physical, chemical, electrical, magnetic, optical, and other properties in comparison to their corresponding bulk metals. As such they are in use or under development in fields such as chemistry, medicine, energy, and advanced electronics, among others.

Synthetic methods for metallic nanoparticles are typically characterized as being "top-down" or "bottom-up" and comprise a variety of chemical, physical, and even biological approaches. Top-down techniques involve the physical breakdown of macroscale or bulk metals into nanoscale particles using a variety of physical forces. Bottom-up methods involve the formation of nanoparticles from isolated atoms, molecules, or clusters.

Physical force methods for top-down metal nanoparticle synthesis have included milling of macroscale metal particles, laser ablation of macroscale metals, and spark erosion of macroscale metals. Chemical approaches to bottom-up synthesis commonly involve the reduction of metal salt to zero-valent metal coupled with growth around nucleation seed particles or self-nucleation and growth into metal nanoparticles.

While each of these methods can be effective in certain circumstances each also has disadvantages or situational inapplicability. Direct milling methods can be limited in the size of particles obtainable (production of particles smaller than ~20 nm is often difficult) and can lead to loss of control of the stoichiometric ratios of alloys. Other physical methods can be expensive or otherwise unamenable to industrial scale.

Chemical reduction techniques can fail in situations where the metal cation is resistant to reduction. Mn(II) for example is notoriously impervious to chemical reduction. Conventional chemical reduction approaches can also be unsuitable for producing nanoparticles for applications that are highly sensitive to oxidation. Tin nanoparticles, for example, can be difficult to obtain from reduction approaches at sizes less than 20 nm and even when so obtained tend to contain a large proportion of $SnO_2$.

Tin is a promising material for battery electrodes. For example, as an anode in a Li-ion battery, tin can store approximately three times the charge density of the commonly used graphite anode. Recently it has been shown that tin-based material holds great promise in use as a Mg-ion insertion type anode for high energy density Mg-ion batteries. In particular, anode material fabricated from ~100 nm tin powder achieved high capacity and low insertion/extraction voltage.

SUMMARY

A method for synthesizing metal nanoparticles and the nanoparticles so synthesized are provided.

In one aspect, a method for synthesizing metal nanoparticles is disclosed. The method includes the step of adding surfactant to a reagent complex:

$$M^0 \cdot X_y \qquad \qquad I,$$

wherein $M^0$ is a zero-valent metal, wherein X is a hydride, and wherein y is an integral or fractional value greater than zero. As described, the reagent complex can be a reagent comprising a zero-valent metal in complex with hydride. In some variations the reagent complex can be in suspended contact with a solvent at the time of addition. In some variations, the hydride can be lithium borohydride, the zero-valent metal can be tin, the surfactant can be octylamine, or any combination thereof.

In another aspect, metal nanoparticles and their method of synthesis is disclosed. The method includes the step of adding surfactant to a reagent complex:

$$M^0 \cdot X_y \qquad \qquad I,$$

wherein $M^0$ is a zero-valent metal, wherein X is a hydride, and wherein y is an integral or fractional value greater than zero. As described, the reagent complex can be a reagent comprising a zero-valent metal in complex with hydride. In some variations the reagent complex can be in suspended contact with a solvent at the time of addition. In some variations, the hydride can be lithium borohydride, the zero-valent metal can be tin, the surfactant can be octylamine, or any combination thereof.

In another aspect metal nanoparticles having an average maximum dimension less than about 20 nm and which are substantially oxide-free is disclosed. In some variations the metal nanoparticles have an average maximum dimension of about 10 nm, are composed substantially of $Sn^0$, or both.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1:
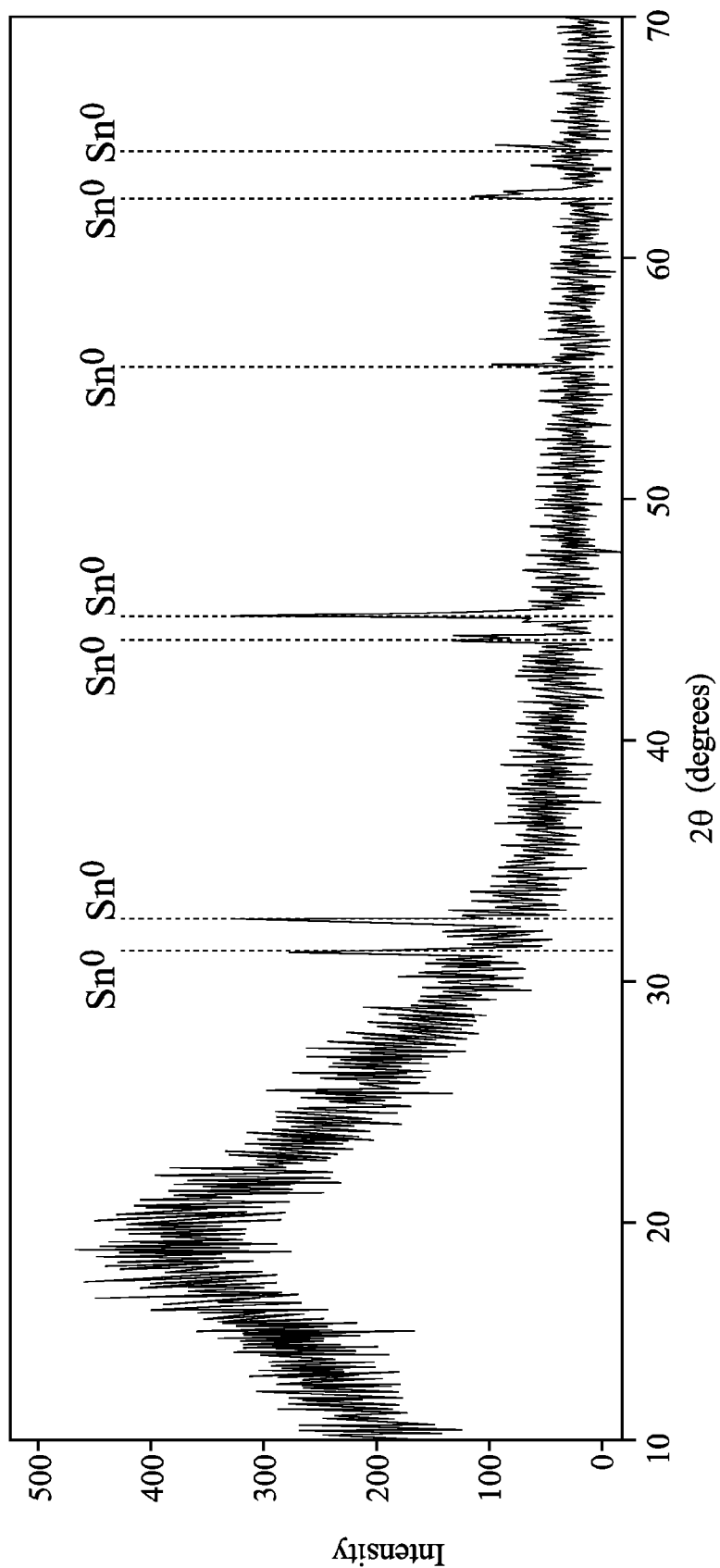
FIG. 1 is an x-ray diffraction spectrum of tin nanoparticles synthesized by the method reported here.

A method for synthesizing metal nanoparticles, the nanoparticles so synthesized, and compositions comprising the nanoparticles are described. As explained in the following description, the method involves a reaction between a surfactant and a novel reagent complex comprising a zero-valent metal and a hydride. A "zero-valent metal" can alternatively be described as an elemental metal or as a metal which is in oxidation state zero. The novel reagent complex can alternatively be described as a complex.

As used here, a "metal" can refer to an alkaline earth metal, an alkali metal, a transition metal, or a post-transition metal. The phrase "transition metal" can refer to any D-block metal of Groups 3 through 12. The phrase "post-transition metal" can refer to any metal of the Groups 13 through 16, including aluminum, gallium, indium, tin, thallium, lead, or bismuth. In some variations, a metal will be a transition metal or a post-transition metal. In some examples a metal will be tin.

As used here, a "hydride" can be a solid metal hydride (e.g. NaH, or MgH$_2$), metalloid hydride (e.g. BH$_3$), complex metal hydride (e.g. LiAlH$_4$), or salt metalloid hydride also referred to as a salt hydride (e.g. LiBH$_4$). The term "metalloid" can refer to any of boron, silicon, germanium, arsenic, antimony, tellurium, or polonium. In some examples the hydride will be LiBH$_4$. Any member of a group consisting of complex metal hydrides and salt metalloid hydrides can be called a "complex hydride". It is to be appreciated that the term hydride as used herein can also encompass a corresponding deuteride or tritide.

A method for synthesizing metal nanoparticles includes the step of adding surfactant to a reagent complex:

$$M^0\text{-}X_y \qquad \text{I,}$$

wherein M$^0$ is a zero-valent metal, wherein X is a hydride molecule, and wherein y is a value greater than zero. In many instances y can be a value greater than zero and less than or equal to four. The value represented by y can be an integral value or a fractional value, such as 2.5. The complex described by Formula I is referred to alternatively herein as a "reagent complex"

The reagent complex can be a complex of individual molecular entities, such as a single metal atom in oxidation state zero in complex with one or more hydride molecules. Alternatively the complex described by Formula I can exist as a molecular cluster, such as a cluster of metal atoms in oxidation state zero interspersed with hydride molecules, or a cluster of metal atoms in oxidation state zero, the cluster surface-coated with hydride molecules or the salt hydride interspersed throughout the cluster.

In some aspects of the method for synthesizing metal nanoparticles, the reagent complex can be in suspended contact with a solvent or solvent system. In some variations, suitable solvents or solvent systems will include those in which a suspension of the reagent complex is stable for an interval of at least one day in an inert environment. In some variations, suitable solvents or solvent systems will include those in which a suspension of the reagent complex is stable for an interval of at least one hour in an inert environment. In some variations, suitable solvents or solvent systems will include those in which a suspension of the reagent complex is stable for an interval of at least five minutes in an inert environment.

The phrase "an inert environment" as used here can include an atmospheric environment that is anhydrous. The phrase "an inert environment" as used here can include an atmospheric environment that is oxygen-free. The phrase "an inert environment" as used here can include an atmospheric environment that is both anhydrous and oxygen-free. The phrase "an inert environment" as used here can include enclosure in an ambient atmosphere comprising an inert gas such as argon, or enclosure in a space that is under vacuum.

The term "stable" as used in the phrase, "in which the reagent complex is stable for an interval" can mean that the reagent complex does not appreciably dissociate or undergo covalent transformation.

The solvent or solvent system employed in certain various aspects disclosed here can be a material that is non-reactive toward the hydride incorporated into the reagent complex. As used above in the phrase "material that is non-reactive toward the hydride", the term "non-reactive" can mean that the material, i.e. the solvent or solvent system, does not directly participate in or bring about covalent reaction of the hydride of the reagent complex to a thermodynamically significant extent. According to such a criterion, suitable solvents or solvent systems can vary depending on the hydride being used. In some variations this can include a solvent or solvent system that is aprotic, non-oxidative or both.

Non-limiting examples of suitable solvents or solvent system components can include acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethyl ether, diethylene glycol, diglyme (diethylene glycol, dimethyl ether), 1,2-dimethoxy-ethane (glyme, DME), dimethylether, dimethyl-formamide (DMF), dimethyl sulfoxide (DMSO), dioxane, ethanol, ethyl acetate, ethylene glycol, glycerin, heptane, Hexamethylphosphoramide (HMPA), Hexamethylphosphorous triamide (HMPT), hexane, methanol, methyl t-butyl ether (MTBE), methylene chloride, N-methyl-2-pyrrolidinone (NMP), nitromethane, pentane, Petroleum ether (ligroine), 1-propanol, 2-propanol, pyridine, tetrahydrofuran (THF), toluene, triethyl amine, o-xylene, m-xylene, or p-xylene.

As non-limiting examples, in some instances a halogenated alkyl solvent can be acceptable, in some instances an alkyl sulfoxide can be acceptable, in other instances an ethereal solvent can be acceptable. In some variations THF can be a suitable solvent or solvent system component.

In some aspects of the method for synthesizing metal nanoparticles, the surfactant can be suspended or dissolved in a solvent or solvent system. In different variations wherein the reagent complex is in suspended contact with a solvent or solvent system and the surfactant is suspended or dissolved in a solvent or solvent system, the reagent complex can be in suspended contact with a solvent or solvent system of the same or different composition as compared to the solvent or solvent system in which the surfactant is dissolved or suspended.

In some aspects of the method for synthesizing metal nanoparticles, the reagent complex can be combined with surfactant in the absence of solvent. In some such cases a solvent or solvent system can be added subsequent to such combination. In other aspects, surfactant which is not suspended or dissolved in a solvent or solvent system can be added to a reagent complex which is in suspended contact with a solvent or solvent system. In yet other aspects, surfactant which is suspended or dissolved in a solvent or solvent system can be added to a reagent complex which is not in suspended contact with a solvent or solvent system.

The surfactant can be any known in the art. Usable surfactants can include nonionic, cationic, anionic, amphoteric, zwitterionic, and polymeric surfactants and combinations thereof. Such surfactants typically have a lipophilic moiety that is hydrocarbon based, organosilane based, or fluorocarbon based. Without implying limitation, examples of types of surfactants which can be suitable include alkyl sulfates and sulfonates, petroleum and lignin sulfonates, phosphate esters, sulfosuccinate esters, carboxylates, alcohols, ethoxylated alcohols and alkylphenols, fatty acid esters, ethoxylated acids, alkanolamides, ethoxylated amines, amine oxides, alkyl amines, nitriles, quaternary ammonium salts, carboxybetaines, sulfobetaines, or polymeric surfactants.

In some instances the surfactant employed in the method for synthesizing metal nanoparticles will be one capable of oxidizing, protonating, or otherwise covalently modifying the hydride incorporated in the reagent complex. In some variations the surfactant can be a carboxylate, nitrile, or amine. In some examples the surfactant can be octylamine.

In some variations the method for synthesizing metal nanoparticles can be performed under an anhydrous environment, under an oxygen-free environment, or under an environment that is anhydrous and oxygen-free. For example, the method for synthesizing metal nanoparticles can be performed under argon gas or under vacuum. While the zero-valent metal $M^0$ can contain some impurities such as metal oxides, the method for synthesizing metal nanoparticles can in some instances produce pure metal nanoparticles, free of oxide species. Such an instance is shown in FIG. 1, an x-ray diffraction spectrum of zero-valent tin nanoparticles produced by the method. It is to be noted that the diffraction spectrum of FIG. 1 indexes to pure, zero-valent tin, free of oxides and measures an average maximum particle dimension of 11 nm.

The complex described by Formula I can be produced by any suitable process. A non-limiting example of a suitable process for preparing the reagent complex includes a step of ball-milling a hydride with a preparation composed of a zero-valent metal. A process employing this step for production of a reagent complex will be referred to herein as the "example process". In many instances the preparation composed of a zero-valent metal employed in the example process will have a high surface-area-to-mass ratio. In some instances the preparation composed of a zero-valent metal will be a metal powder. It is contemplated that the preparation composed of a zero-valent metal could be a highly porous metal, a metal with a honeycomb structure, or some other preparation with a high surface-area-to-mass ratio.

In some instances the preparation containing a zero-valent metal can include a zero-valent transition metal. Suitable transition metals include, but are not limited to cadmium, cobalt, copper, chromium, iron, manganese, gold, silver, platinum, titanium, nickel, niobium, molybdenum, rhodium, palladium, scandium, vanadium, and zinc. In some instances the preparation containing a zero-valent metal can include a zero-valent post-transition metal. Suitable post-transition metals include aluminum, gallium, indium, tin, thallium, lead, or bismuth.

It is to be understood that the zero-valent metal, be it transition metal, post-transition metal, alkali metal, or alkaline earth metal, will be in oxidation state zero. As used herein, "zero-valent" and "oxidation state zero" are taken to mean that the material can exhibit a substantial, but not necessarily complete, zero oxidation state. For example, the preparation containing a zero-valent metal can include some surface impurities such as oxides.

It is contemplated that the phrase "high-surface-area-to-mass ratio" can encompass a broad range of surface-area-to-mass ratios and, in general, the surface-area-to-mass ratio of the preparation composed of a zero-valent metal employed will be that which is required by the time constraints of the example process. In many instances, a higher surface-area-to-mass ratio of the preparation composed of a zero-valent metal will lead to more rapid completion of the example process. In the case where the preparation composed of a zero-valent metal is a metal powder for example, smaller particle size of the metal powder can tend to lead to more rapid completion of the example process and resultant production of the reagent complex.

Non-limiting examples of hydrides suitable for use in the example process include sodium borohydride, lithium aluminium hydride, diisobutylaluminium hydride (DIBAL), Lithium triethylborohydride (super hydride), sodium hydride and potassium hydride, calcium hydride, lithium hydride, or borane.

In some variations of the example process, the hydride can be mixed with the preparation composed of a zero-valent metal in a 1:1 stoichiometric ratio of hydride molecules to metal atoms. In other variations the stoichiometric ratio can be 2:1, 3:1, 4:1 or higher. In some variations the stoichiometric ratio of hydride molecules to metal atoms in the preparation composed of a zero-valent metal can also include fractional quantities, such as 2.5:1. It is to be understood that, in cases where the example process is employed for production of the reagent complex, the stoichiometry of admixture in the example process will tend to control the stoichiometry of the complex according to Formula I as indicated by the value of y.

It is contemplated that a ball mill used in the example process can be of any type. For example the ball mill employed can be a drum ball mill, a jet mill, a bead mill, a horizontal rotary ball mill, a vibration ball mill or a planetary ball mill. In some examples the ball mill employed in the example process will be a planetary ball mill.

It is contemplated that the ball-milling media used in the example process can be of any composition. For example, the ball-milling media employed can be composed of metal such as stainless steel, brass, or hardened lead or they can be composed of ceramic such as alumina or silica. In some variations the ball milling media in the example process will be stainless steel. It is to be appreciated that the ball-milling media can be of a variety of shapes, for example they can be cylindrical or spherical. In some variations the ball-milling media will be spherical.

Optionally, a variety of analytical techniques can be employed to monitor the example process and to determine successful completion thereof. Some such techniques, such as x-ray photoelectron spectroscopy (XPS) and x-ray diffraction (XRD) are discussed below, but any analytical approach known to be useful in the art can be optionally employed.

Figure 2A:
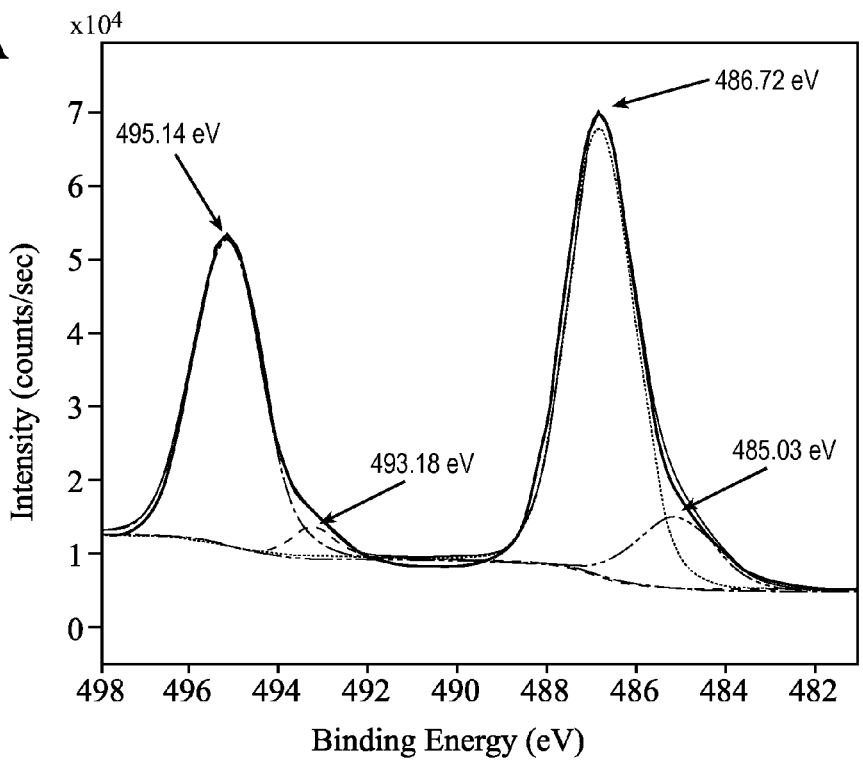
FIG. 2A is an x-ray photoelectron spectrum of $Sn^0$ powder.
Figure 2B:
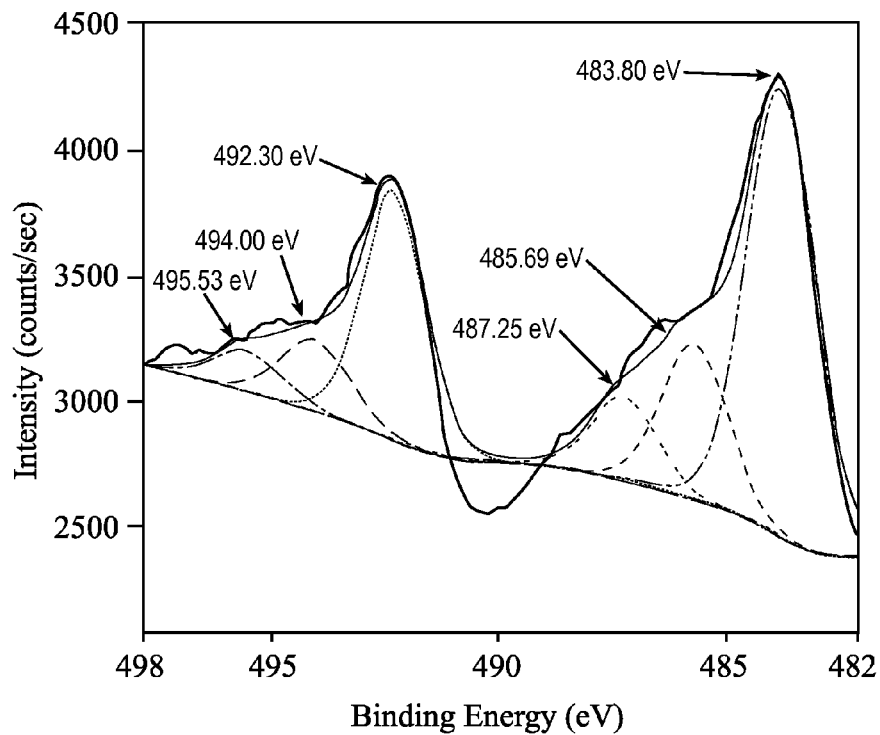
FIG. 2B is an x-ray photoelectron spectrum of an Sn. $(LiBH_4)_2$ complex prepared by the process reported here.

XPS scans in the tin region are shown for elemental tin powder and for a reagent complex $Sn.(LiBH_4)_2$, in FIGS. 2A and 2B, respectively. In FIGS. 2A and 2B, heavy solid lines show the raw XPS data and light solid lines show the adjusted data. Dashed and/or dotted lines show the individual deconvoluted peaks of the spectra. The center points in electron-Volts of deconvoluted peak maxima are indicated by arrows.

Figure 2C:
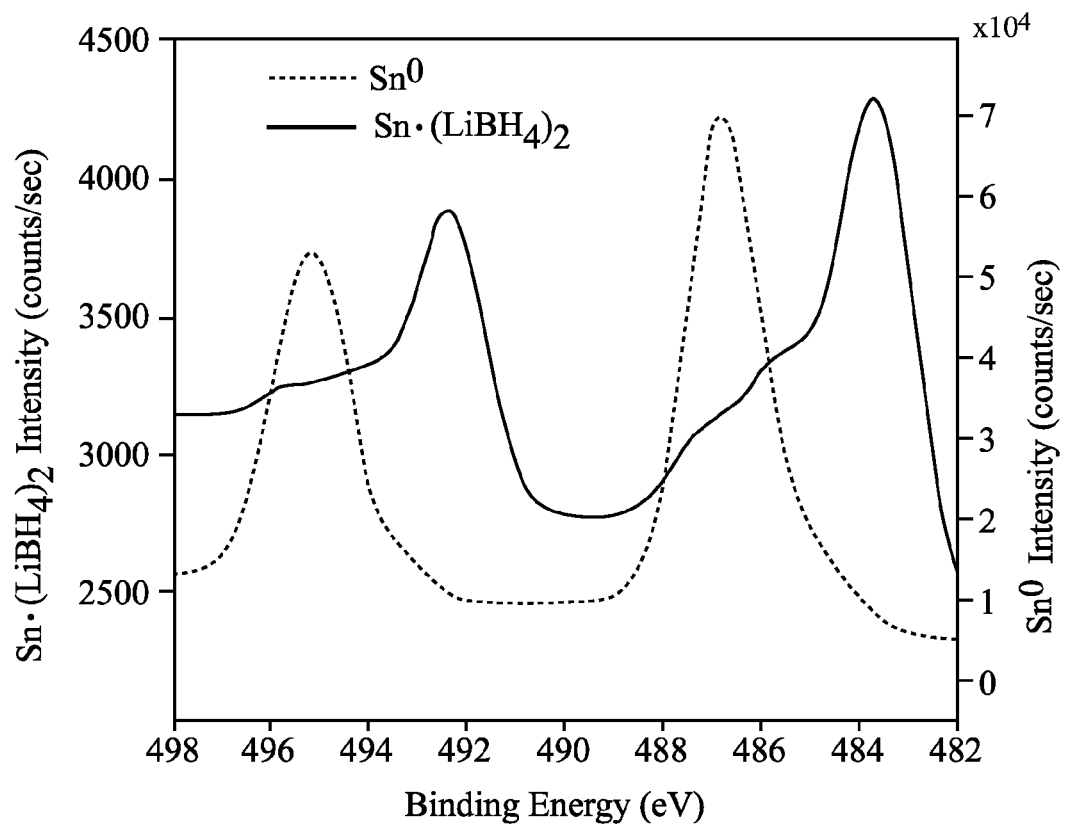
FIG. 2C is an overlay of the x-ray spectrum of $Sn^0$ powder of FIG. 2A and the x-ray photoelectron spectrum of an Sn. $(LiBH_4)_2$ complex prepared by the process of FIG. 2 of FIG. 2B.

FIG. 2C shows an overlay of the adjusted spectrum of uncomplexed tin (dotted line), from FIG. 2A, with the adjusted spectrum of the $Sn.(LiBH_4)_2$ complex (solid line), from FIG. 2B. As can be seen in FIG. 2C, complex formation between the zero-valent tin and the lithium borohydride results in the appearance of new peaks and a general shift of the spectrum toward lower electronic energy of the observed electrons of the zero-valent metal. In some instances where the reagent complex is prepared by the example process, x-ray photoelectron spectra of the zero-valent metal incorporated in the reagent complex will be generally shifted toward lower energy as compared to the spectra of the uncomplexed zero-valent metal. In some instances, reagent complexes wherein $M^0$ is tin and X is lithium borohydride can be identified by the presence of an x-ray photoelectron spectroscopy peak centered at about 484 eV.

In some variations, the example process can be performed under an anhydrous environment, an oxygen-free environment, or an anhydrous and oxygen-free environment. For example, the example process can be performed under argon gas or under vacuum. This optional feature can be included, for example, when the hydride used in the example process is a hydride that is sensitive to molecular oxygen, water, or both.

As mentioned, Mg-ion batteries employing tin-based anodes have shown promise as high energy density alternatives to conventional Li-ion batteries (N. Singh et al., Chem. Commun., 2013, 49, 149-151; incorporated by reference herein in its entirety). In particular, tin anodes based on ~100 nm $Sn^0$ powder have shown impressive capacity and insertion/extraction voltage in such systems. A dramatic decrease in the tin nanostructure of such an anode can improve such a system's rate capability and cyclability, but requires tin nanoparticles which are oxide-free. Tin nanoparticles such as 11 nm oxide free tin nanoparticles disclosed here and represented in FIG. 1 can be a useful anode material in such a battery system.

The present invention is further illustrated with respect to the following examples. It needs to be understood that these examples are provided to illustrate specific embodiments of the present invention and should not be construed as limiting the scope of the present invention.

EXAMPLE 1

0.503 g of tin metal powder and 0.187 g of lithium borohydride are combined in a planetary ball mill. The combination is ball-milled in a planetary ball-mill for 4 hours at 400 rpm (using a Fritsch pulervisette 7 planetary ball mill) in a 250 mL stainless steel airtight ball-mill jar with 1¾ inch, 3½ inch, and 5¼ inch 316 stainless steel ball bearings. The resulting ball-milled complex is suspended in THF. The suspension is titrated with a solution of 0.443 g octylamine in 10 mL of THF. The ensuing reaction proceeds at ambient temperature to completion in approximately 3 hours, resulting in zero-valent tin nanoparticles with an average grain size of about 11 nm, as shown in the x-ray diffraction spectrum of FIG. 1. The spectrum of FIG. 1 indexes to pure tin metal that is free of oxide species.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for synthesizing metal nanoparticles, comprising:
adding surfactant to a reagent complex according to a formula, $M^0 \cdot X_y$, wherein $M^0$ is a zero-valent metal, X is a hydride, and y is an integral or fractional value greater than zero.

2. The method of claim 1 wherein the reagent complex is in suspended contact with a solvent.

3. The method of claim 2 wherein the solvent is an ethereal solvent.

4. The method of claim 3 wherein the ethereal solvent is tetrahydrofuran.

5. The method of claim 1 wherein the zero-valent metal is a zero-valent post-transition metal.

6. The method of claim 5 wherein the period 5 zero-valent post-transition metal is tin.

7. The method of claim 6 wherein the complex has an x-ray photoelectron spectroscopy peak centered at about 484 eV.

8. The method of claim 1 wherein the surfactant comprises an aliphatic amine.

9. The method of claim 8 wherein the surfactant comprises octylamine.

10. The method of claim 1 wherein the hydride is a salt metalloid hydride.

11. The method of claim 10 wherein the hydride is a borohydride.

12. The method of claim 11 wherein the hydride is lithium borohydride.

13. The method of claim 1 further comprising the step, prior to adding surfactant to the reagent complex, of:
ball-milling a mixture containing a hydride a preparation composed of a zero-valent metal.

14. The method of claim 13 wherein the preparation composed of a zero-valent metal is a preparation of tin.

15. The method of claim 13 wherein the hydride is a salt metalloid hydride.

16. The method of claim 15 wherein the hydride is a borohydride.

17. The method of claim 16 wherein the hydride is lithium borohydride.

18. The method of claim 13 wherein the hydride and the preparation composed of a zero-valent metal are mixed in a stoichiometric ratio of hydride molecules to zero-valent metal atoms of about 1:1, 2:1, 3:1, 4:1, or intermediate ratios.

19. Metal nanoparticles synthesized by a method comprising:
adding surfactant to a reagent complex according to a formula, $M^0 \cdot X_y$, wherein $M^0$ is a zero-valent metal, X is a hydride, and y is an integral or fractional value greater than zero.

20. The metal nanoparticles of claim 19 wherein the reagent complex is in suspended contact with a solvent.

21. The metal nanoparticles of claim 19 wherein the surfactant comprises octylamine.

22. The metal nanoparticles of claim 19 consisting essentially of a post-transition metal.

23. The metal nanoparticles of claim 22 wherein the post-transition metal is tin and the nanoparticles have an average maximum dimension less than about 20 nm.

24. The metal nanoparticles of claim 23 which are substantially oxide free and characterized in that their average maximum dimension is about 10 nm.

25. A battery electrode comprising the metal nanoparticles of claim 19.

* * * * *